(12) United States Patent
Abrahamsson et al.

(10) Patent No.: US 10,676,221 B2
(45) Date of Patent: Jun. 9, 2020

(54) ASSEMBLY AND METHOD FOR HANDLING PACKAGING CONTAINERS

(71) Applicant: Tetra Laval Holdings & Finance S.A., Pully (CH)

(72) Inventors: Martin Abrahamsson, Lund (SE); Christer Nordqvist, Klippan (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 232 days.

(21) Appl. No.: 15/743,495

(22) PCT Filed: Jun. 23, 2016

(86) PCT No.: PCT/EP2016/064520
§ 371 (c)(1),
(2) Date: Jan. 10, 2018

(87) PCT Pub. No.: WO2017/009016
PCT Pub. Date: Jan. 19, 2017

(65) Prior Publication Data
US 2018/0265235 A1    Sep. 20, 2018

(30) Foreign Application Priority Data
Jul. 10, 2015   (SE) ...................................... 1551006

(51) Int. Cl.
*B65B 7/16*     (2006.01)
*B65B 1/14*     (2006.01)
(Continued)

(52) U.S. Cl.
CPC .......... *B65B 7/16* (2013.01); *B29C 66/43122* (2013.01); *B65B 51/144* (2013.01)

(58) Field of Classification Search
CPC .... B65B 7/00; B65B 7/16; B65B 7/18; B65B 51/144; B65B 61/24; B29C 66/43122
(Continued)

(56) References Cited

U.S. PATENT DOCUMENTS 2,329,311 A * 9/1943 Waters ...................... B65B 3/04
53/449
2,481,611 A * 9/1949 Moore ...................... B65B 1/24
53/525
(Continued)

FOREIGN PATENT DOCUMENTS

DE    2520503 A1 * 11/1976 ............... B65B 7/18
DE    3537137 A1    4/1987
(Continued)

OTHER PUBLICATIONS

International Search Report and Written Opinion for International Application No. PCT/EP2016/064520 dated Oct. 7, 2016 in 9 pages.
(Continued)

*Primary Examiner* — Stephen F. Gerrity
(74) *Attorney, Agent, or Firm* — Knobbe Martens Olson & Bear LLP

(57) ABSTRACT

An assembly and method for handling packaging containers for foodstuffs is disclosed. The assembly and method may include a support plate attachable on a rail for holding packaging containers raised from a sheet of web material, a membrane arranged on the support plate and at least one inlet for receiving fluid intended to inflate the membrane. The assembly may be arranged at a sealing station for the packaging container and the membrane may be configured to be inflated through the fluid inlet in order to press against at least two walls of the packaging container during sealing of the container in order to prevent bulging of the sealed container.

14 Claims, 4 Drawing Sheets

(51) Int. Cl.
  *B29C 65/00*   (2006.01)
  *B65B 51/14*   (2006.01)

(58) Field of Classification Search
  USPC ... 53/476, 477, 484, 565, 285, 370.7, 371.8, 53/372.6, 373.2, 373.7, 374.8, 375.6
  See application file for complete search history.

(56) References Cited

U.S. PATENT DOCUMENTS

| | | | | |
|---|---|---|---|---|
| 3,039,250 | A * | 6/1962 | Pancrazi | B67B 3/16 53/329 |
| 3,881,762 | A * | 5/1975 | Zappia | B65B 21/186 294/98.1 |
| 4,312,168 | A * | 1/1982 | Desom | B67B 5/032 53/333 |
| 4,790,587 | A * | 12/1988 | Stoll | B23Q 7/043 294/119.3 |
| 5,085,029 | A * | 2/1992 | Esper | B65B 51/144 100/269.04 |
| 5,555,708 | A * | 9/1996 | Shower et al. | B29C 66/43121 493/141 |
| 5,809,741 | A | 9/1998 | Tovey | |
| 5,836,139 | A * | 11/1998 | Yoshida et al. | B65B 7/16 53/387.3 |
| 5,975,158 | A | 11/1999 | Gordon et al. | |
| 7,444,794 | B1 | 11/2008 | Anderson | |
| 7,964,829 | B2 * | 6/2011 | Vess | A61H 9/0092 156/272.2 |
| 2006/0016158 | A1 * | 1/2006 | Johansson et al. | B65B 51/144 53/479 |
| 2013/0227918 | A1 * | 9/2013 | Paradisi et al. | B65B 9/2049 53/551 |

FOREIGN PATENT DOCUMENTS

| | | | | |
|---|---|---|---|---|
| EP | 0600130 | A2 | 6/1994 | |
| EP | 0727367 | A1 | 8/1996 | |
| GB | 1493855 | A * | 11/1977 | B65B 61/24 |
| JP | H 0398826 | A | 4/1991 | |

OTHER PUBLICATIONS

Swedish Office Action for Application No. 1551006-8 dated Mar. 4, 2016 in 7 pages.

* cited by examiner

ASSEMBLY AND METHOD FOR HANDLING PACKAGING CONTAINERS

The present invention is related to an assembly and a method for handling packaging containers for foodstuffs. More particularly, the assembly and method of the present invention aim at reducing bulging of packaging containers for foodstuffs.

BACKGROUND

Packaging containers, i.e. containers made out of a sheet of packaging material have been known for a long time in the packaging industry. The packaging material from which the container is raised usually consists of several layers fused together to form a packaging laminate. One typical composition of a packaging laminate is an outer polymer layer on top of a core layer of fiber-based material, such a carton and one inner polymer layer having the function of a liquid barrier towards the foodstuff to be contained. In some variants, a barrier layer, often aluminium foil, is sandwiched between two polymer layers on top of the core layer facing the interior of the container when raised. These types of packaging laminates are assembled into packaging containers in order to contain foodstuffs with a higher acidity or to provide longer shelf life for foodstuffs stored under ambient conditions.

Usually, blanks of a packaging laminate from which the packaging container is raised are provided on rolls and fed to a converting facility where they are cut into different webs, i.e. slitted, and provided with crease lines. The crease lines are weakening lines in the packaging laminate along which the blank can be folded and raised into a container. Since the cutting and creasing operations are well-known in the art, they will not be elaborated in detail here.

Once the blanks are raised into a container, the container is, depending on the type of packaging container, sterilized and later filled with the foodstuff to be contained.

Containers made from such blanks of packaging laminate are known under various brands, such as Tetra Brik™, Tetra Brik Aseptic™, Tetra Brik Edge™, Tetra Rex™ and so on.

In the course of development of newer types of packaging materials which require lesser amounts of paper and polymer, the packaging containers have become thinner and lighter than the originally developed ones leading to one problem emerging especially for packaging containers having volumes of 1000 ml and higher. The raised, filled and sealed packages show a bulging effect due to the weight of the foodstuff pressing on the relatively thin walls of the packaging container, making them more difficult to handle in distribution equipment and also unattractive in appearance both to producers and consumers alike. The problem of bulging has been in existence a number of years and several solutions have been developed to solve it.

One existing solution uses metal plates arranged on opposite sides of a conveyor belt engaging the packaging containers from the time they are raised until they are forwarded to the distributing equipment. This solution provides some reduction of the bulging effect, but still not satisfactory. One other disadvantage of the solution is that it is static and does not fit different package shapes and sizes.

One other solution is described in the U.S. Pat. No. 5,975,158A where a compression bar located inside a holder for gable top containers presses against the walls of the container during the time the container is sealed at its top end. This solution is similar to the previous one described and also has the same disadvantages, namely that the compression exerted on the container walls is static and not optimal for different container shapes and sizes. The final sealed gable top package may thus still display visible bulging for different container types.

There is thus a need for a solution providing a flexible way to minimize bulging for a variety of packaging container shapes and sizes in an optimum way.

SUMMARY

The present invention offers a solution to at least some of the problems with prior art by an assembly and a method. Preferred embodiments are disclosed in the dependent claims.

According to one aspect of the present invention, a solution is provided by an assembly for handling packaging containers for foodstuffs, comprising:
  a support plate attachable on a rail for holding packaging containers raised from a sheet of web material;
  a membrane arranged on the support plate;
  at least one inlet for receiving fluid intended to inflate the membrane,
  wherein the assembly is arranged at a sealing station for the packaging container and wherein the membrane is configured to be inflated through the fluid inlet in order to press against at least two walls of the packaging container before sealing of the container is started at the sealing station in order to prevent bulging of the sealed container.

According to one other aspect of the present invention, a solution is provided by a method for handling packaging containers for foodstuffs, comprising:
  inflating a membrane arranged on a rail for holding packaging containers at a sealing station for packaging containers;
  receiving a packaging container at a sealing station;
  pressing the membrane against at least one side of the packaging container before sealing of the packaging container has started;
  deflating the membrane to disengage the at least one side of the packaging container when sealing of the packaging container has started and
  sealing the packaging container.

DETAILED DESCRIPTION

DETAILED DESCRIPTION

The description below is an illustration of example embodiments of the present invention. In no way should the description of these embodiments be understood as limiting the present invention. Embodiments described herein are for illustration purposes only. Ultimately, the present invention is only limited by the accompanying patent claims.

Figure 1:
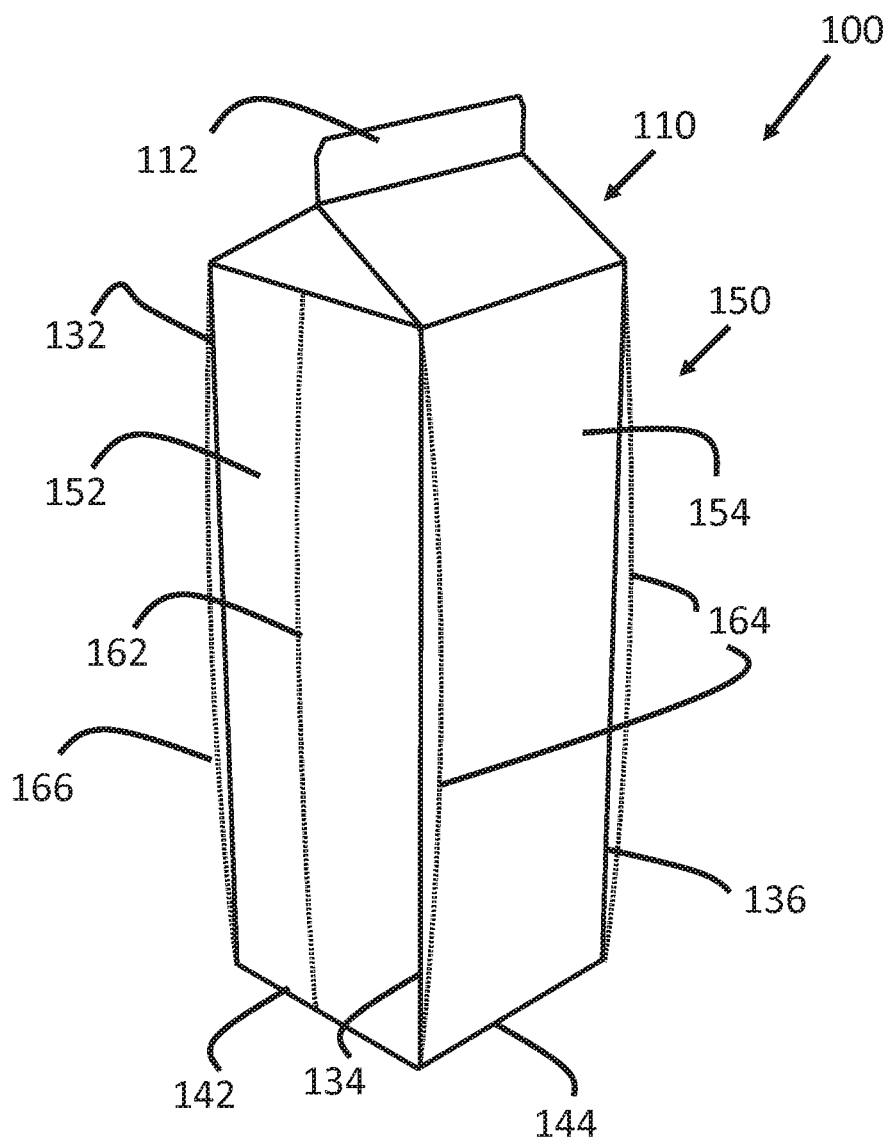
FIG. 1 illustrates a packaging container according to prior art where the effect of bulging on the container shape is shown.

FIG. 1 illustrates a gable top packaging container 100 known from prior art. It comprises a top portion 110 with a top sealing fin 112 and a body portion 150 delimited by body panels 152, 154 and two additional body panels on the other side of the packaging container 100 not illustrated in FIG. 1. We will refer to the body panel 154 as the front body panel and the body panel 152 as the side body panel. Conversely, one identical side body panel is present opposite the side body panel 152 although not shown in FIG. 1. Likewise, the body panel opposite the front body panel 154 and not shown in FIG. 1 will be referred as the body back panel.

Now, a gable top container, such as the one shown in FIG. 1, is raised from a flat blank of packaging material, usually a packaging laminate, by being folded along longitudinal crease lines defining the panels of the raised container, transversal crease lines defining the bottom portion of the container and the top crease lines defining the gable top portion of the container. A subset of longitudinal crease lines is illustrated as the longitudinal crease lines 132, 134, 136 and another subset of transversal crease lines is illustrated by the crease lines 142, 144.

Due to the relatively thin walls or panels of the gable top packaging container 100 and the weight of the foodstuff (usually more or less liquid) filled into the container, the final shape of the container after filling and sealing will display a visible bulging effect illustrated by the dotted lines 162, 164 and 166. This effect becomes more pronounced with decreasing packaging material thickness and increasing packaging container size.

Figure 2A:
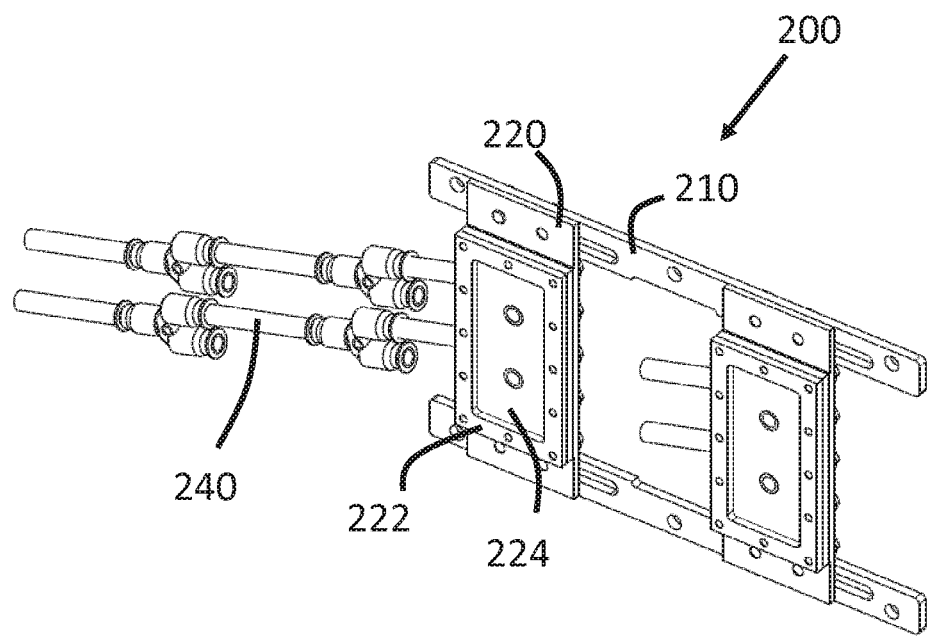
FIGS. 2A and 2B illustrate an assembly for handling packaging containers according to one embodiment of the present invention.

FIG. 2A illustrates one part of an assembly 200 for handling packaging containers (not shown). The packaging containers, of which the packaging container from FIG. 1 is one example, are preferably largely or entirely made of a blank of packaging material folded along crease lines provided in the packaging material before the converting stage. It is worthwhile mentioning that other packaging containers where, for example, a top section is made of a polymer material, may show a similar bulging effect. Now, in the course of converting, the blanks, after being folded into hollow tubes of packaging material are bottom sealed, sterilized and brought to a filling apparatus all the while being transported on a so called station chain. In the filling apparatus the foodstuffs to be contained in the now almost finished packaging container are poured into the packaging container.

Once filled, the packaging containers are transported further to a sealing station where the top portion of the packaging container is to be sealed. It is at this stage that the assembly 200 comes into play.

Through different tests by the applicant it has namely been discovered that the phase in the raising of a packaging container which affects container bulging the most is the top sealing phase. By ensuring that bulging is controlled just before the top sealing operation has started, excessive bulging of the final filled and sealed package may be effectively prevented.

For this purpose, an assembly 200 comprising support plates 220 attached to the guide part 210 of the station chain, an attachment frame 222 attachable to the support plates 220 and a membrane 224, which in this example is provided as a bellow 224, is arranged near or at the position at which the packaging containers are top sealed in the top sealing unit (not shown).

Figure 2B:
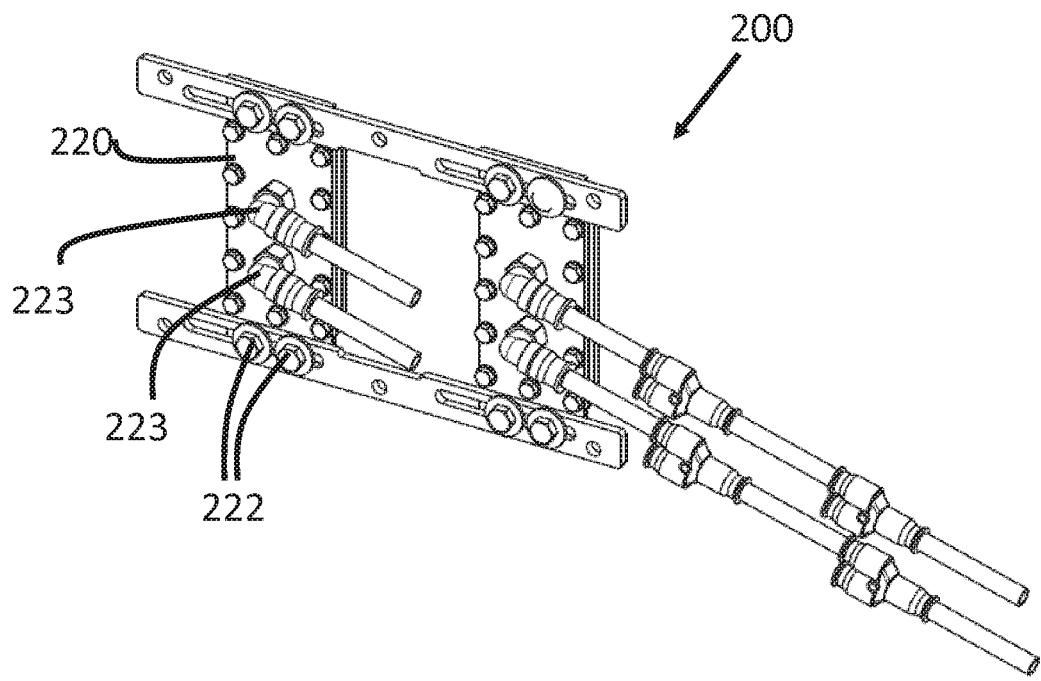

While FIG. 2A shows one half of the assembly 200 attached to one side of the guide part 210 of the station chain, FIG. 2B shows the other half of the assembly 200 intended to be attached on the opposite side of the guide part 210 facing the first half of the assembly 200. In between these two halves two packaging containers who have been filled with foodstuffs in the previous station are able to be held.

In order to prevent excessive bulging of the packaging containers, the membranes 224 are provided with fluid inlets 223 through which fluid, such as air or water or other gases or liquids are supplied in order to inflate the membranes in the direction of the walls of the packaging container. The fluid inlets 223 are connected to a pneumatic unit (not shown) supplying pressurized fluid to the membranes 224 in order to inflate them. Once the membranes 224 are fully inflated the front and back walls of the packaging container, such as packaging container in FIG. 1, are pressed together preventing bulging in the direction of the membranes 224. To minimize bulging of the side walls of the packaging container, the pneumatic unit controls the supply of fluid to the membranes 224, such that the membranes are fully inflated just before the top sealing unit is sunk into the top portion of the packaging container in order to seal it along the top fin. It has been found that this arrangement achieves an optimum result with respect to container bulging, as opposed to pressing against the front and back walls of the package during the filling stage of the packaging container.

The amount of fluid and fluid pressure is controllable through a fluid valve which may be located either near the fluid inlets 223 of the assembly 200 or at some other point along the fluid supply lines 240.

Figure 2C:
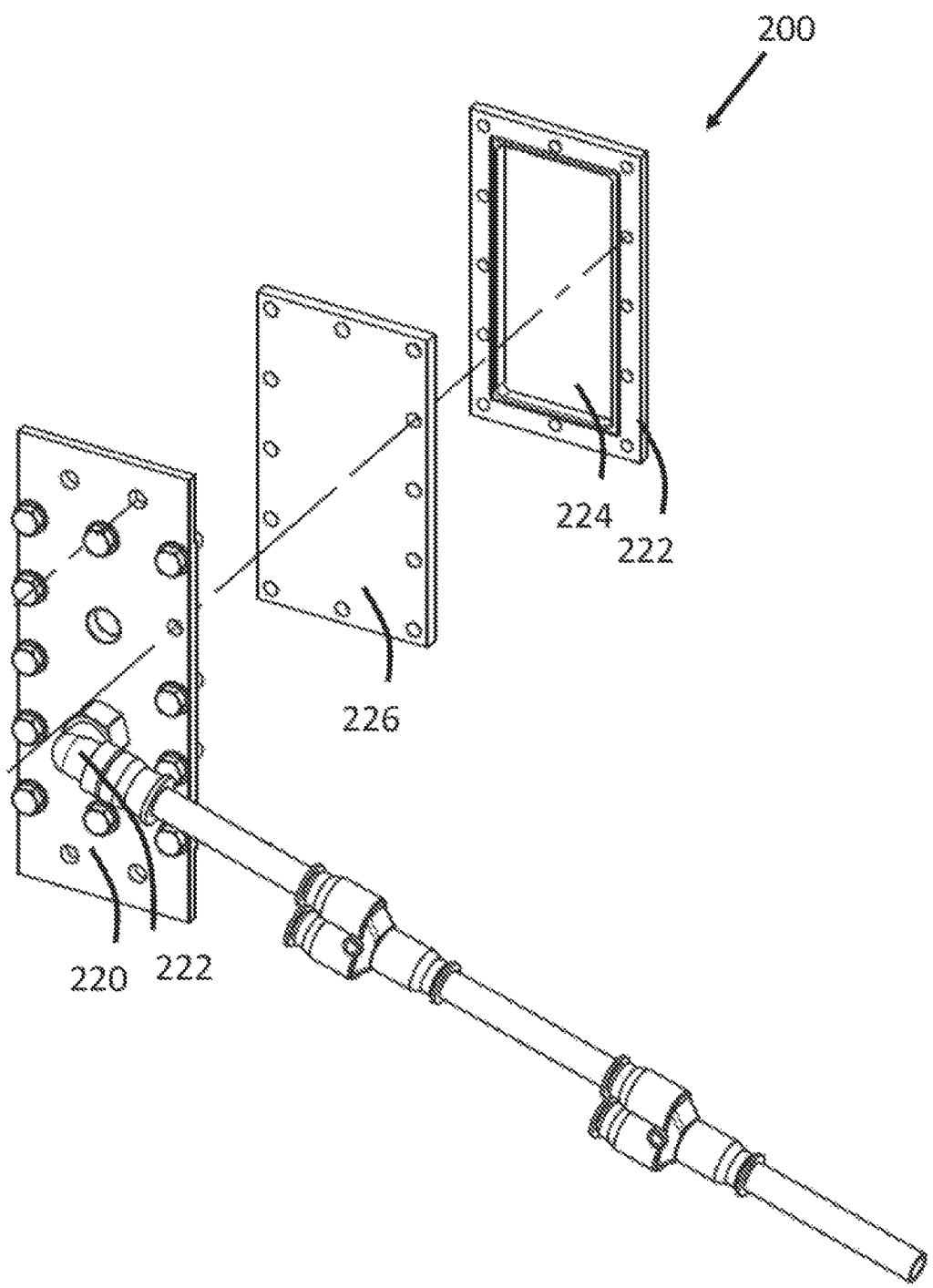
FIG. 2C illustrates the same embodiment of an assembly in an exploded view.

FIG. 2C shows an exploded view of the assembly 200 from FIGS. 2A and 2B where a second support plate 226 is shown to which the attachment frame 222 containing the membrane 224 may be fastened.

It should be mentioned that the assembly in FIGS. 2A-2C may consist of one or more pairs of membranes, depending on how many packaging containers are to be top sealed at the same time and the two pairs illustrated in FIGS. 2A-2C are only exemplary. It would also be possible to only use one or more assemblies only comprising one or more membranes on one side of the station chain guides. The opposite site may then contain a rigid support plate against which the back panel of a packaging container can be pressed. Also, the membrane used in the present invention may be any elastic body inflatable by any possible means, such as through air, water or other fluids.

Figure 3:
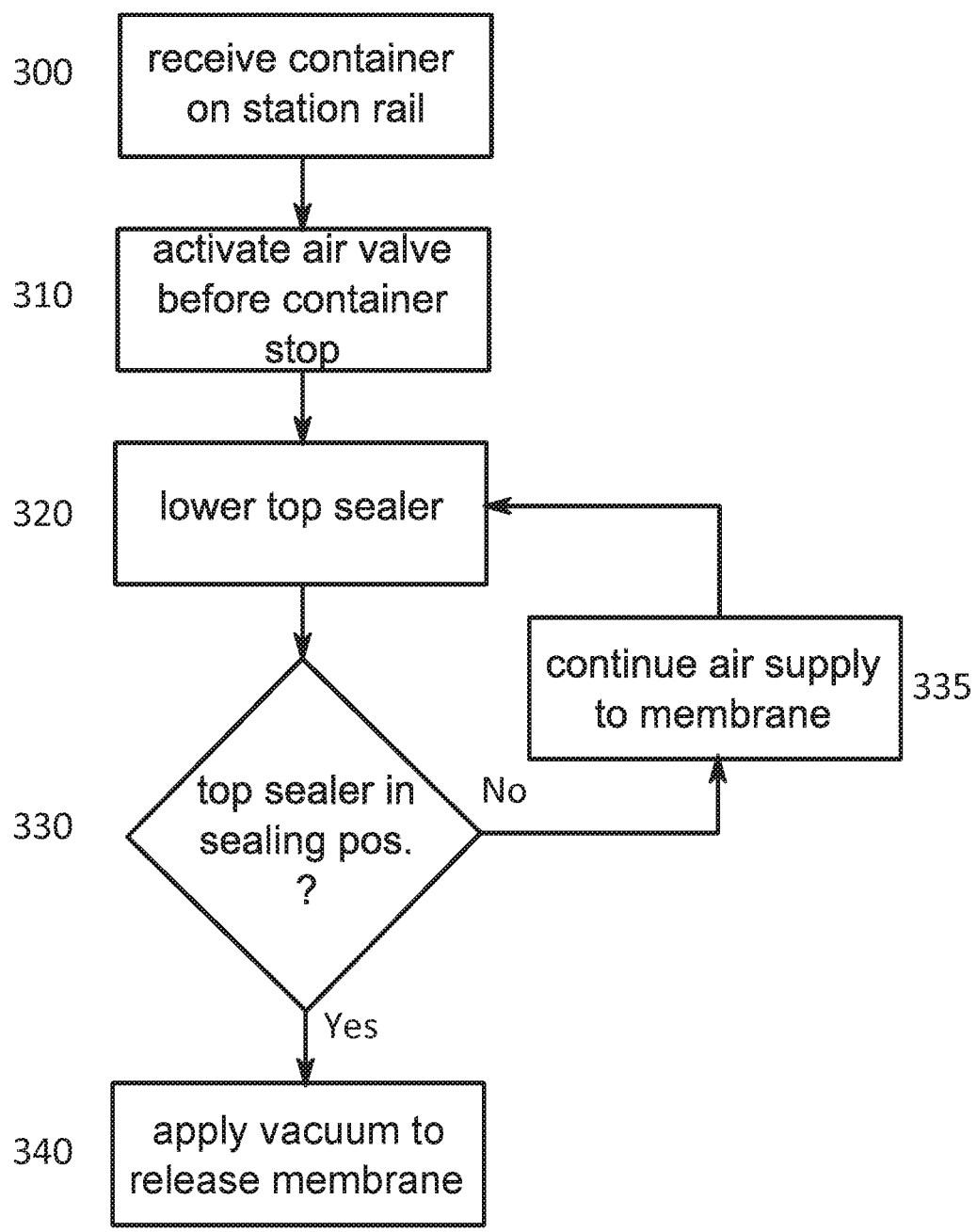
FIG. 3 illustrates a method for handling packaging container according to one embodiment of the present invention.

FIG. 3 illustrates a method for handling packaging containers for the purpose of minimizing container bulging according to one embodiment of the present invention.

At step 300 a packaging container, such as the packaging container shown in FIG. 1, is received on a station rail at a top sealing station where a top sealing unit is configured to fold the top along the top crease lines to form a gable shape and to seal the packaging container at its top fin and. In index-based filling and sealing machines, the packaging containers are stopped (indexed) at every station before being forwarded to the next. Thus, the packaging containers will stop when having arrived at the top sealing station.

However, to achieve an optimum result, i.e. to minimize the container bulging, a pneumatic unit controlling air supply to a pair of membranes, such as the membranes 224 described in FIGS. 2A-2C will open the air valves at step 310 in order start inflating the membranes before the packaging container has come to a standstill at the transversal sealing station. In this way, the membranes intended to be pressing against the front and back walls of the packaging container at the transversal sealing station will be fully inflated just before the sealing operation has started. This timing chosen for inflating the membranes has been found to yield optimal results with respect to container bulging.

At step 320 the top sealing unit is lowered into the top portion of the packaging container which is filled with foodstuffs but still held open.

At step 330, the pneumatic unit checks whether the top sealing unit has reached is final sealing position in the top portion of the packaging container. If that is the case, it switches at step 340 the direction of the pressurized air to instead leave the membranes and thus suck the air out of the membranes until they return to their relaxed state and no pressure is exerted on the front and back walls of the packaging container. The reason for this action is to avoid the build-up of overpressure inside the packaging container during top sealing.

Otherwise, the pneumatic unit at step 335 continues supplying pressurized air to the membrane while the top sealing unit is being lowered into its final position at the top of the packaging container.

It should be mentioned that the timing for the start of air supply to the membrane via air inlets, such as the air inlets 223 in FIGS. 2A-2C) may be adjustable by an operator and/or be pre-programmed in the pneumatic unit and depend on the size and shape of the packaging container to be sealed. In this way, bulging for different container types and sizes may be minimized. Also, the amount of pressure exerted by the pairs of membranes onto the packaging container walls may adjustable by the operator by adjusting the air pressure supplied to the membranes.

A skilled person having studied the description and the accompanying drawings will realize that there are other possible ways of implementing the assembly and the method according to the present invention which is only limited by the accompanying claims.

The invention claimed is:

1. An assembly for handling packaging containers for foodstuffs, comprising:
   a support plate configured to attach to a rail configured to hold packaging containers raised from a sheet of web material;
   a membrane arranged on the support plate;
   wherein the assembly is arranged at a sealing station for a packaging container, the sealing station configured to seal a packaging container;
   a fluid inlet configured to receive a fluid; and wherein the membrane is configured to be inflated by fluid that passes through the fluid inlet and to press against a wall of the packaging container during sealing of the packaging container at the sealing station so as to prevent bulging of the sealed container.

2. An assembly according to claim 1, further comprising a pair of support plates configured to attach to the rail on opposite sides of the sealing station.

3. An assembly according to claim 1, wherein the amount of fluid used to inflate the membrane is adjustable.

4. An assembly according to claim 1, further comprising a frame configured to attach to the support plate, the frame configured to enclose the membrane between the support plate and itself.

5. An assembly according to claim 1, wherein the membrane is pneumatically controlled.

6. An assembly according to claim 1, wherein the amount of fluid supplied to the membrane is controlled by a pneumatic valve connected to the fluid inlet.

7. A method for handling packaging containers for foodstuffs, comprising:
   inflating a membrane arranged on a rail configured to hold packaging containers at a sealing station configured to seal packaging containers;
   receiving a packaging container at the sealing station;
   pressing the membrane against a side of the packaging container before sealing of the packaging container by the sealing station has started;
   deflating the membrane to disengage the side of the packaging container when sealing of the packaging container by the sealing station has started; and
   sealing the packaging container.

8. A method according to claim 7, wherein the container received at the sealing station is filled with foodstuff.

9. A method according to claim 7, wherein the membrane is inflated through a fluid inlet arranged in the support plate attached to the membrane.

10. A method according to claim 9, wherein the amount of fluid for inflating the membrane is controlled by a fluid valve.

11. A method according to claim 10, wherein the fluid valve is opened before the packaging container has arrived at the sealing station.

12. A method according to claim 11, wherein the membrane has been inflated to a maximum size before the sealing of the packaging container has started.

13. A method according to claim 10, further comprising controlling the amount of bulging of the packaging container by controlling the amount of fluid pressure supplied to the membrane and the pressure of the membrane onto the side of the packaging container.

14. A method according to claim 10, wherein the fluid valve is pneumatically controlled.

\* \* \* \* \*